March 7, 1967  M. S. SHEBANOW  3,307,557
DATA PROCESSING APPARATUS
Filed Aug. 11, 1965  7 Sheets-Sheet 2

INVENTOR
MICHAEL S. SHEBANOW
BY
*Fred Jacob*
ATTORNEY

March 7, 1967 M. S. SHEBANOW 3,307,557
DATA PROCESSING APPARATUS
Filed Aug. 11, 1965 7 Sheets-Sheet 4

INVENTOR
MICHAEL S. SHEBANOW
BY Fred Jacob
ATTORNEY

March 7, 1967  M. S. SHEBANOW  3,307,557
DATA PROCESSING APPARATUS

Filed Aug. 11, 1965  7 Sheets-Sheet 5

INVENTOR
MICHAEL S. SHEBANOW
BY Fred Jacob
ATTORNEY

March 7, 1967 M. S. SHEBANOW 3,307,557
DATA PROCESSING APPARATUS
Filed Aug. 11, 1965 7 Sheets-Sheet 6

INVENTOR
MICHAEL S. SHEBANOW
BY Fred Jacob
ATTORNEY

United States Patent Office 3,307,557
Patented Mar. 7, 1967

3,307,557
DATA PROCESSING APPARATUS
Michael S. Shebanow, Medfield, Mass., assignor to Honeywell Inc., Minneapolis, Minn., a corporation of Delaware
Filed Aug. 11, 1965, Ser. No. 478,887
20 Claims. (Cl. 129—16.1)

The present invention relates in general to new and improved unit record selection apparatus and in particular to apparatus for automatically selecting a unit record at random from a plurality of records in response to a selection signal addressed to the selected record.

While it is not so limited, the invention is applicable and will be explained with reference to specific record processing apparatus wherein the unit records take the form of flexible cards or tape strips. In one practical embodiment of the invention, the cards include at least one surface of magnetizable material on which data may be stored in the form of discrete magnetized spots located along a plurality of substantially parallel tracks. Equipment of this type is normally associated with a data processing system which is capable of operating at very high speeds. Accordingly, it is important for the individually addressed cards to be selected rapidly from a deck or stack of cards where they are normally stored, to be transported past a processing station where the desired data transfer is carried out and to be quickly returned to the stack thereafter in order to be again available for selection.

Heretofore available unit record processing equipment of the type described has met with only moderate success. This is due to the limited record processing rates of such equipment and further, due to relatively poor reliability under sustained periods of high-speed operation. False as well as multiple card selections are not uncommon in such equipment and frequent breakdowns, traceable to the complexity of the equipment, necessitate the interruption of the operation of the associated data processing system.

It is the primary object of the present invention to provide random access card selection apparatus which is not subject to the foregoing disadvantages.

Conventionally, the cards are suspended in their normal storage location by means of selection rods which engage notches in the upper card edge. A pair of holding rods additionally engages slots in the card side edges for the purpose of regulating the time of a card selection. In heretofore available equipment of this kind, the cross-section of each selection rod effectively cooperates with the configuration of the corresponding notch to suspend the card in one rotational rod position and to release it in a second rotational position approximately 90° displaced from the first position. A card selection is carried out by actuating those selection rods which are effective to suspend the addressed card and to rotate them to their releasing position. This permits the addressed card to drop into supporting engagement with the aforesaid pair of holding rods. Thereafter, the holding rods are rotated out of engagement with the slots they engage in the card side edges, to permit the selected card to fall free of the other cards which remain suspended on the selection rods. All the rods subsequently rotate back to their original positions.

As previously stated, it is desirable to keep the length of the record processing cycle small. To this end, the card selection step must be kept as brief as possible. The use of cooperating selection rods and notches in the manner described above dictates that the two rotational positions of each selection rod are very nearly 90° apart. Upon the occurrence of a card selection signal, each addressed selection rod must be rotated through this angle from a card-retaining position to a card-releasing position, thereby taking up a substantial portion of the allowable card selection interval. Similarly, the return rotation of each addressed selection rod through 90° to its original position, which must be completed before another card selection can take place, takes up a considerable amount of time to delay the selection of the subsequent card. Thus, a decrease of the required angle of rotation in order to speed up the selection step is clearly desirable.

Accordingly, it is another object of the present invention to provide random access card selection apparatus wherein the card notch configuration and the selection rods cooperate such that the selection rods need to rotate only approximately 45° between their opposite rotational positions.

It is a further object of the present invention to provide record cards for use in random access card selection apparatus wherein successive notches are paired, each pair comprising notches of opposite kinds sequenced in accordance with a first or a second binary digit represented thereby.

It is an additional object of the present invention to provide random access card selection apparatus wherein successive selection rods are paired, the rods within each pair being arranged to rotate concurrently to mutually opposite positions.

Where the cards are supported on the selection rods, as described above, the selection rods necessarily rotate in contact with the interior of the aforesaid card notches during a card selection. This action contributes materially to the wear of the notches which ultimately become enlarged to the point where they no longer reliably support a card. The most common manifestation of notch wear is a false card drop or a multiple dropping of cards in response to a single card selection signal. False card drops delay the operation which is to be carried out.

Multiple card drops almost invariably result in damage to one or more of the simultaneously dropped cards and hence in the destruction of the data recorded on the card.

A further disadvantage of a card selection system wherein the cards are supported directly on the selection rods during the selection process derives from the fact that the required rod actuating force becomes inordinately large. While this is not an important consideration where the number of cards in the stack is small, e.g. less than 50, it becomes appreciable where several hundred cards are supported on the selection rods. The larger rod actuators required by such heavy loads increase the cost of the overall equipment. More importantly, the larger rod actuators generally have a slower response time, thereby lengthening the card selection interval.

It is a further object of the present invention to provide random access card selection apparatus wherein notch wear is minimized and the necessity for large selection rod actuators is obviated.

It is still another object of the present invention to provide random access card selection apparatus in which the operation of the holding rods and of the selection rods is timed such that the rotation of the selection rods occurs only when they are out of contact with the notches engaged thereby.

As previously explained, after a card is selected and is moved out of the proximity of the adjacent suspended cards, it is transported past a data transfer station and is subsequently returned to the election rods. In prior art card selection apparatus, the selected card, after the data transfer has taken place, is brought into a position normal to the selection rods wherein the card notches are precisely in registry with the ends of the selection rods. The card is then moved in a direction parallel to the selection rods until the latter enter the card notches endwise. Simultaneously, the holding rods must enter the slots in the side edges of the card endwise.

The mechanism required for bringing the card precisely into registry with the rod ends in the manner described above must, of necessity, be complex. Not only must the card be precisely positioned with respect to two mutually perpendicular coordinates, but it must thereafter be translationally moved in a direction parallel to the rods until the rod ends enter their corresponding notches and slots respectively. The tolerances required in order to carry out this operation are small and must take account of positional variations of the free end of each rod which, at least during the card return operation, is supported only at its opposite end.

Accordingly, it is yet another object of the present invention to provide random access card selection apparatus wherein the rods remain fully supported during the card selection and return steps.

These and other objects of the present invention, together with the features and advantages thereof, will become apparent from the following detailed specification, when read in conjunction with the accompanying drawings, in which.

Figure 1:
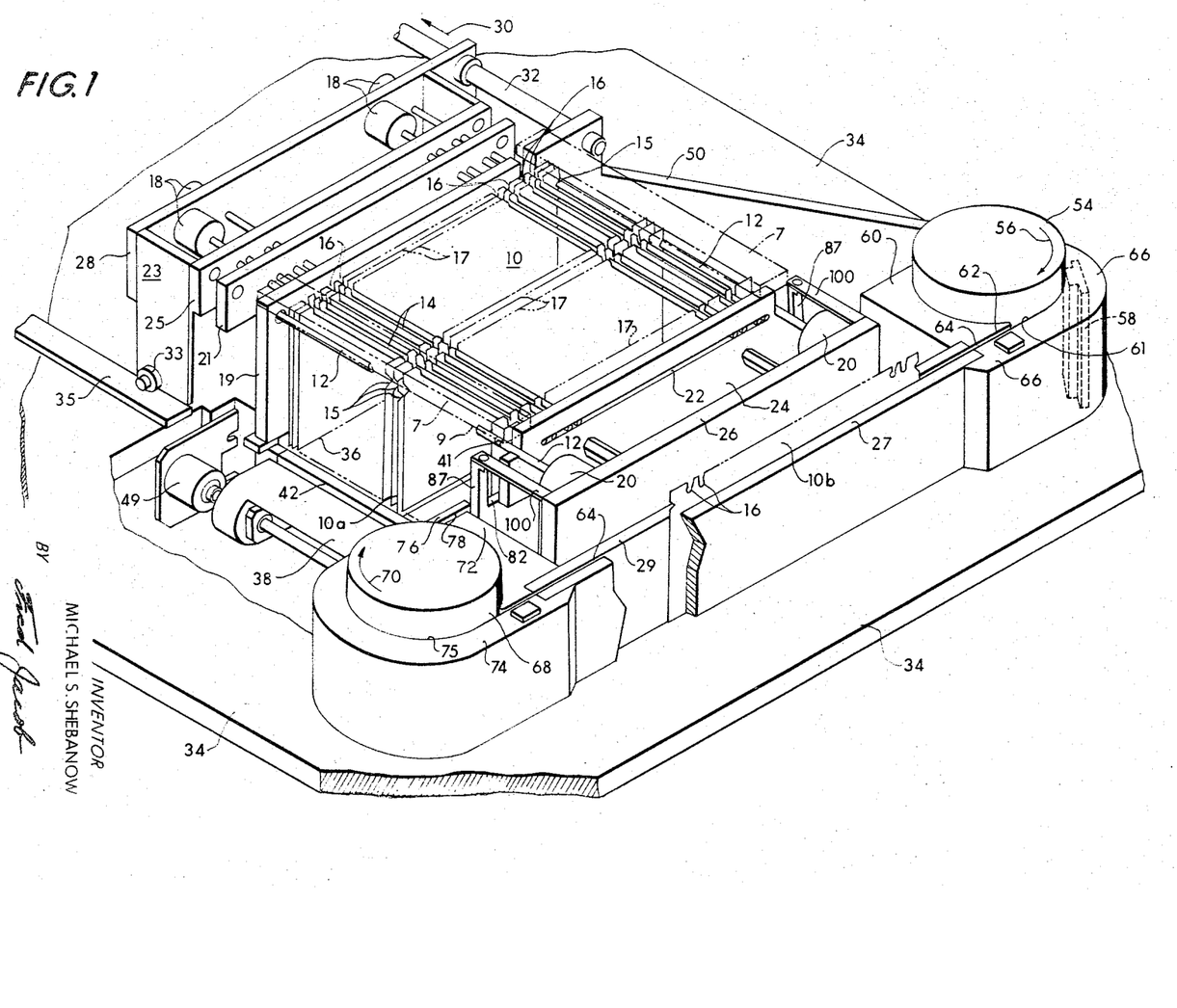
FIGURE 1 illustrates a preferred embodiment of the present invention as applied to card processing apparatus wherein the invention may be employed.

With reference now to the drawings, FIGURE 1 illustrates a card processing system in which the present invention may find application. It will be understood, however, that the invention is not so limited. A stack of unit records in the form of substantially rectangular cards or tape strips 10, is suspended on a pair of holding rods 12, which engage corresponding slots 15 in the opposite, vertical side edges of each card. Each holding rod 12 includes a limited length 41 of relieved cross-section, as explained further hereinbelow. Corresponding slots 15 of the successively stacked cards 10 are aligned in rows, each being positioned close to the upper major card edge 17. A plurality of selection rods 14, arranged in successive pairs in a horizontal plane, engages corresponding pairs of notches 16 which are disposed along the upper major edge 17 of each card. Corresponding notches 16 of the respective cards are aligned in rows, each row being engaged by a single selection rod 14.

For the sake of clarity, only a limited number of notches is shown in each card in FIGURE 1, it being understood that in an actual embodiment of the invention notches may be disposed along the entire card edge 17. As will become apparent from the discussion below, the number of notches determines the number of cards in the stack from which a random card selection can be made. Only those selection rods are shown in FIGURE 1 which engage the correspondingly illustrated notches. In practice, a separate selection rod 14 corresponds to each row of notches 16.

For the sake of illustration, only a limited number of cards is illustrated in FIGURE 1. In actual practice, the cards are stacked all along the length of the rods 12 and 14 and they are spaced closer together than it is possible to illustrate in the drawings.

A plate 19 rotatably supports the rods 12 and 14. The cards 10 are confined by the plate at one extreme of the stack as shown, and by a mechanical gate at the other extreme as will be explained in greater detail hereinbelow. Each card preferably has one magnetizable surface which faces the plate 19 and further includes a conductive coating on its opposite surface in order to dissipate static charges built up by friction. As explained above, data may be recorded on the magnetizable card surface in the form of discrete magnetized spots disposed in parallel tracks.

Figure 5A:
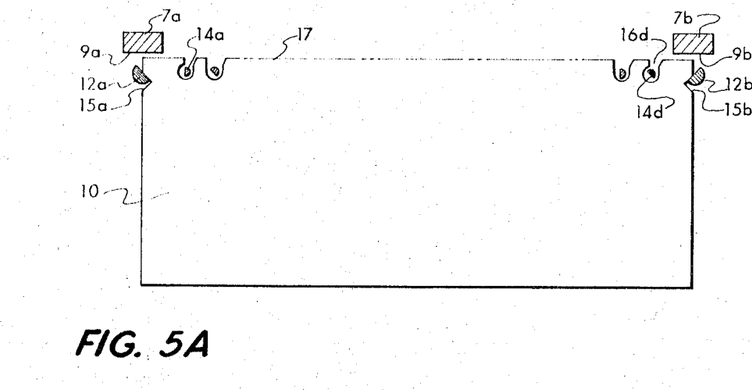
FIGURES 5A and 5B illustrate in detail the cooperation of pertinent portions of the present invention.

A pair of guides 7 is illustrated in phantom outline for the sake of clarity illustrating the parts below. The guides 7 are positioned above the selection rods 14 and run the depth of the stack. The guides include a pair of coplanar horizontal guide surfaces 9, vertically spaced from the upper card edges a distance sufficient only to permit the cards to move freely along the rods. Each guide surface 9 is seen to straddle the side edges of successive cards, as best illustrated in FIGURE 5. Conveniently, the guides 7 may be incorporated as part of a card stack cartridge, or they may be separately mounted above the selection rods. It is also feasible to combined them to provide a single guide surface above the stacked cards.

A support plate 24 is held by a plate 26, which is itself mounted on a working surface 34. A solenoid 20, which is supported on the plate 26, is mechanically coupled to one end of each holding rod 12, as shown, and is adapted to rotate the latter. The support plate 24 contains a slot 22 which receives the ends of the selection rods 14 in a manner permitting the rods to rotate. At the other end, the rods extend through the plate 19, through an intermediate plate 21 and then to a support generally designated by the reference numeral 23, which has front and rear plates 25 and 28 respectively. A set of rotary solenoids 18 is mounted on the structure 23, in staggered relationship behind and in front of plate 28. The selection rods 14 are coupled mechanically to the solenoids 18, and, accordingly, they extend through plate 25 only, or through both of plates 25 and 28.

The supporting structure 23 forms a carriage which is adapted to be moved in the direction of the arrow 30 when it is desired to withdraw the rods 14 in order to replace the stack of cards 10. The requisite force for carrying out this withdrawal is applied to the bar 32 and the movement of the carriage 23 is determined by a pair of rollers 33 and corresponding guide rails 35, positioned on opposite sides of the carriage.

Figure 2:
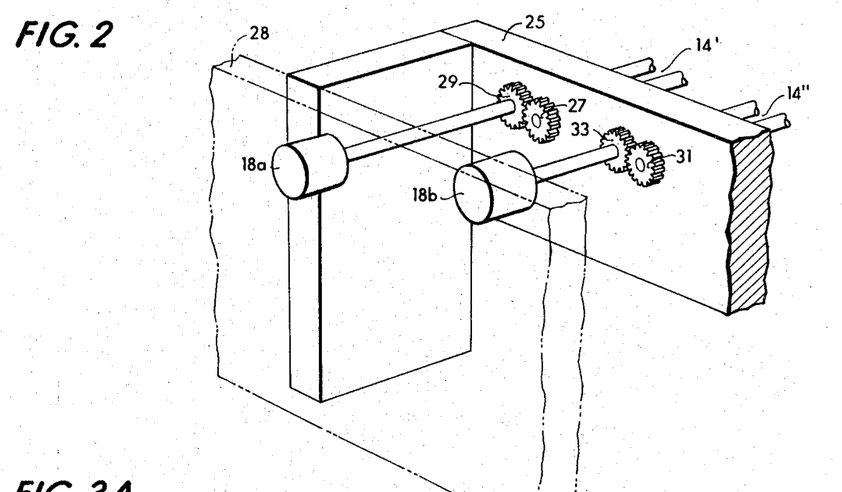
FIGURE 2 illustrates in greater detail pertinent portions of the preferred embodiment of the present invention.

FIGURE 2 illustrates a portion of the carriage from the rear, with the plate 28 shown in phantom outline in order to expose pertinent portions of the apparatus. One of the rods of the rod pair 14' is seen to extend through the front plate 25 and has a gear 27 fastened to the end thereof. The other rod of the rod pair 14' similarly extends through the plate 25 to the rotary solenoid actuator 18a which is mounted on the front surface of the plate 28. The last-mentioned rod carries a gear 29 which mates with the aforesaid gear 27 so that the rods fastened to these gears rotate simultaneously in opposite directions upon the energization of the solenoid actuator 18a. Similarly, the rod pair 14" includes one rod that extends through the plate 25 and terminates in a gear 31 fastened thereto. The other rod of the rod pair 14" extends through the plates 25 and 28 to the solenoid actuator 18b which is mounted on the rear surface of the plate 28. A gear 33 is carried by the latter rod such that the rods 14" rotate simultaneously in opposite directions upon the energization of the solenoid actuator 18b.

The cards are normally suspended on the rods above a reference plane, which is determined by the aforesaid planar working surface 34. The lower major edges 36 of the vertically suspended cards are horizontally positioned, equally spaced from the reference plane. A waiting platform 38 includes a planar portion which lies in the aforesaid reference plane. The platform 38 constitutes a surface having a width which spans the entire stack of cards suspended above it. As explained in greater detail below and as illustrated by the card 10a in FIGURE 1, a card is selected by dropping it to the waiting platform. An impelling bar 42 spans the width of the platform 38, its height permitting it to pass below the lower card edges 36 without interference with the suspended cards. The impelling bar is adapted to be belt-actuated from a servo motor 49 to traverse the length of the platform 38. This movement imparts a forward motion to the selectively dropped card 10a which is at rest on the waiting platform 38. The start position of the impelling bar is accurately determined by the operation of the servo motor 49 and is immediately in front of the facing card side edge.

A guide 50 is positioned substantially normal to the working surface 34 and presents a guide surface extending from the card stack 10 to a vacuum read capstan 54. The selected card, which is propelled forward by the impelling bar 42 and which travels with its lower edge 36 in contact with the reference plane, arrives at the aforesaid guide surface under its own momentum and is deflected in the direction of the read capstan 54. The external surface of the read capstan contains perforations through which a vacuum may be applied internally of the capstan to retain the card in contact with the external capstan surface. The read capstan rotates at a constant speed in the direction of the arrow 56, to transport the card held in contact therewith at a predetermined velocity past a data transfer station 58. In a preferred arrangement, the data transfer station includes a plurality of magnetic heads, each adapted to confront a different track of the aforesaid magnetizable card surface.

The surface of the guide 50 which faces the cards, is continued in an abutting guide structure 66. The structure 66, together with an additional guide 60, present curved surfaces to the read capstan 54 to form an internal raceway 61 in cooperation with the external read capstan surface. An external raceway 64 is formed by a pair of closely spaced parallel guide plates 27 and 29. The plates 27 and 29 continue the surfaces of the internal raceway 61. The intersection between the raceway 61 and 64 is formed by a rounded ridge 62. The card arriving at the capstan 54 under its own momentum, is held in contact with the external capstan surface, data transfers being effected one track at a time in a preferred arrangement. When the required data transfers have been completed, the vacuum is selectively removed from a sector of the capstan in the vicinity of the ridge 62. The leading card edge then enters the raceway 64 as a result of both centrifugal force action and the inherent flexibility of the card.

The card moves down the raceway 64 under its own momentum, as illustrated at 10b in FIGURE 1. The raceway surfaces of plates 29 and 27 are continued by a pair of guide structures 72 and 74 respectively. The last-mentioned guide structures form an internal raceway 75 with the external surface of a vacuum return capstan 68. The capstan 68 is similarly constructed to retain a card on its external surface by the internal application of vacuum pressure. The return capstan is adapted to rotate in the direction of the arrow 70, at a constant speed which is preferably less than the speed of the read capstan 54. A plate 76 forms an internal raceway 78 with the aforesaid guide structure 72, the raceways 75 and 78 intersecting in similar manner to that of the raceways 61 and 64. The card 10b traveling down the raceway 64 under its own momentum is drawn into contact with the external surface of the return capstan 68 which slows the card down and reverses its direction of travel by 180°.

Figure 4A:
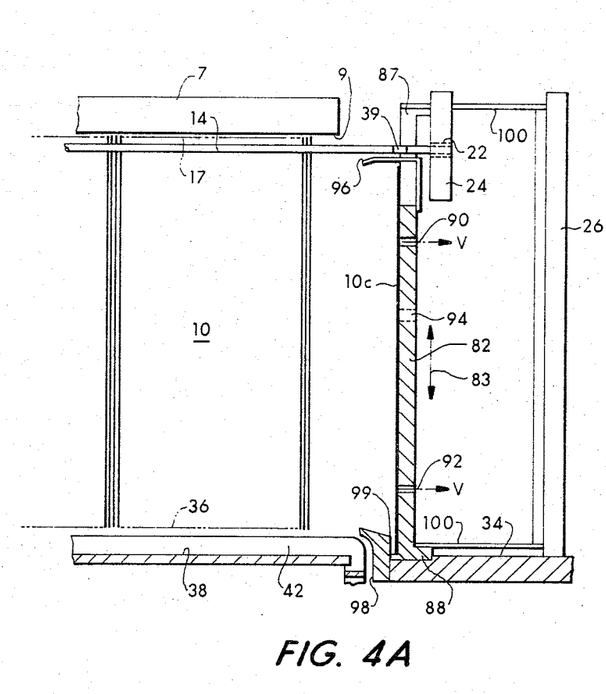
FIGURES 4A and 4B illustrate in greater detail the apparatus of FIGURE 1 relative to a card return operation.
Figure 4B:
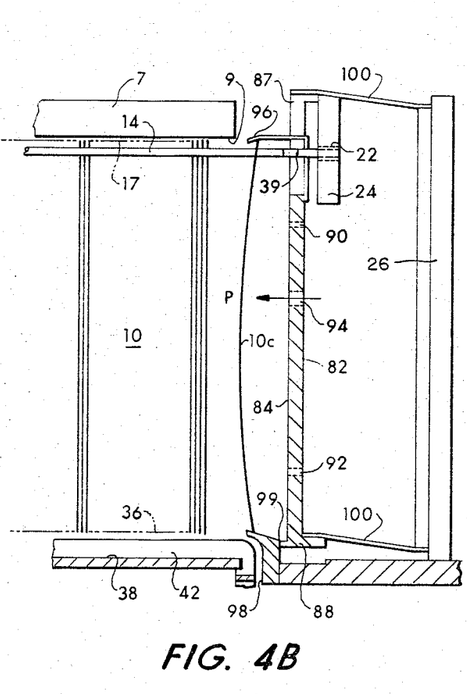

As shown in FIGURES 1 and 4, a lift plate 82 presents a planar surface 84 to the card exiting from the raceway 78. The aforesaid plate surface is substantially normal to the reference plane and is parallel to the suspended cards 10. The lift plate includes a pair of extension arms 87, as well as a shelf 88 normal to the plate surface 84. The forward portion of the shelf 88 is coplanar with the working surface when the lift plate is in its normal position, as illustrated in FIGURE 4A. The lift plate is supported on two pairs of flexures 100, fastened to the extension arms 87 and to the rear portion of the shelf 88, at opposite sides of the plate. The flexures are further attached to a pair of shoulders of the plate 26. The flexures permit the lift plate to be raised to the position shown in FIGURE 4B, when a force is selectively applied thereto.

The plate 82 further includes a series of aligned apertures 94, positioned between an upper and lower row of holes 90 and 92 respectively. A series of hook-like structures 96, which extend above the upper plate edge, jointly define the upper lip of the above-mentioned mechanical gate. The lower lip 98 of the aforesaid gate faces the lip 96 and is positioned above the reference plane in fixed relationship to the latter. The forward portion of the lip 98 is concave to accommodate the impelling bar 42, while the rear of the lip 98 includes an elbow 99. Lips 96 and 98 respectively, converge in a direction away from the plate 82 and terminate abruptly in a common vertical plane. In the raised position of the plate 82, as shown in FIGURE 4B, the mutual spacing of the lips 96 and 98 in the common vertical plane is slightly less than the height of a card.

Vacuum pressure is applied through the holes 90 and 92 in order to arrest the card traveling with its lower edge 36 in the reference plane, as it arrives at the lift plate surface 84 from the raceway 78. The applied vacuum pressure is effective to decelerate the arriving card and finally to bring it to a halt in a precisely predetermined position. The lower card edge 36 now rests on the shelf 88. In this position the card, designated 10c in FIGURE 4A, is held in contact with the surface 84, the card notches 16 being positioned below their corresponding selection rods 14 and in vertical alignment with the latter. One rod from each pair of selection rods includes a limited length 39, centered about the plane of the plate surface 84. As explained in greater detail hereinbelow, each length 39 of a selection rod presents a relieved cross-section to the corresponding notch 16. Although not shown in FIGURE 4B, the holding rods 12 similarly contain a limited length 41 of relieved cross-section, which is centered about the plane of the surface 84 and which is presented to the slots 15.

Upon command, the plate 82 is lifted to raise the card 10c. It will be noted from FIGURE 4B that the hook-like structures 96, in the raised position of the plate, pass between respective pairs of selection rods and extend above the latter. Also, in this position the card notches 16 engage the lengths 39 of relieved cross-section in the selection rods, while the slots 15 engage the limited lengths 41 of the holding rods. The card notches 16 thus engage the selection rods from below as the lift plate rises, while the card slots similarly engage the holding rods 12. Positive air pressure is applied through the apertures 94 in the raised position of the lift plate and is effective to force the card 10c off the plate surface 84, against the action of the applied vacuum pressure. The card moves to the left in FIGURE 4B, i.e. in the direction of the suspended cards 10, which are positioned on the other side of the aforesaid mechanical gate. The applied positive air pressure bows the flexible card slightly to the left, as shown in FIGURE 4B, enabling the card to pass through. The mechanical gate serves as a restraint on the suspended cards 10 of the stack to keep them from moving too far to the right, in the same manner as the plate 19 defines the other boundary of the card stack.

Figure 3A:
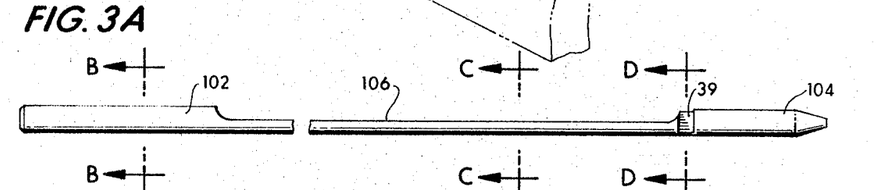
FIGURES 3A to 3F illustrate in greater detail a pair of selection rods, as employed in the preferred embodiment of the present invention.

With the foregoing description as background, the random access card selection technique which forms the subject matter of this application will now be considered in detail. FIGURE 3 illustrates a preferred embodiment of a pair of selection rods 14. As shown, the rod includes a pair of end sections 102 and 104 and a central section 106. The aforesaid relieved length 39 of the selection rod is seen to be located in the end section 104, immediately adjacent the center section 106.

Figure 3B:
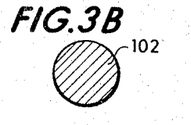
Figure 3C:
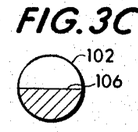
Figure 3D:
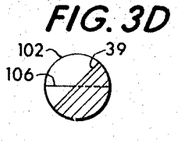
Figure 3E:
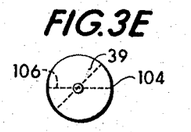

As best shown in FIGURE 3B, which represents a cross-section of the selection rod taken at line B—B in FIGURE 3A, the end portion 102 is circular in cross-section. The cross-section of the center section 106 is seen to be D-shaped, as best shown in FIGURE 3C, representing a cross-section taken at line C—C in FIGURE 3A. FIGURE 3D represents a cross-section taken at line D—D in FIGURE 3A, i.e. through the relieved section 39. The latter is seen to be similarly D-shaped in cross-section, but is rotationally displaced with respect to the D-shaped cross-section of the center section 106, by an angle of approximately 45°. FIGURE 3E is an end view taken from the right-hand side of the structure shown in FIGURE 3A. The end section 104, which tapers downward at its tip, is seen to be substantially circular in cross section. FIGURE 3E further shows the cross-sections of the relieved length 39 and of the center section 106, as being displaced approximately 45° with respect to each other.

Figure 3F:
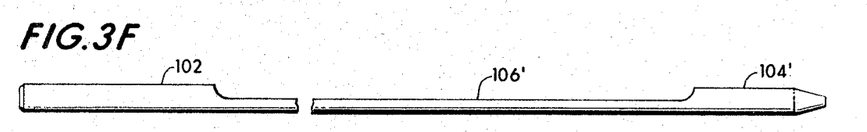

FIGURES 3A to 3E illustrate one selection rod of each selection rod pair. The other rod of the pair differs from that shown only in the absence of the relieved length 39. This is illustrated in FIGURE 3F. The central rod section 106', of D-shaped cross-section, is now seen to be longer, at the expense of the end section 104'. Both of the rods illustrated in FIGURE 3 are, of course, of the same length.

Figures 6A, 6B:
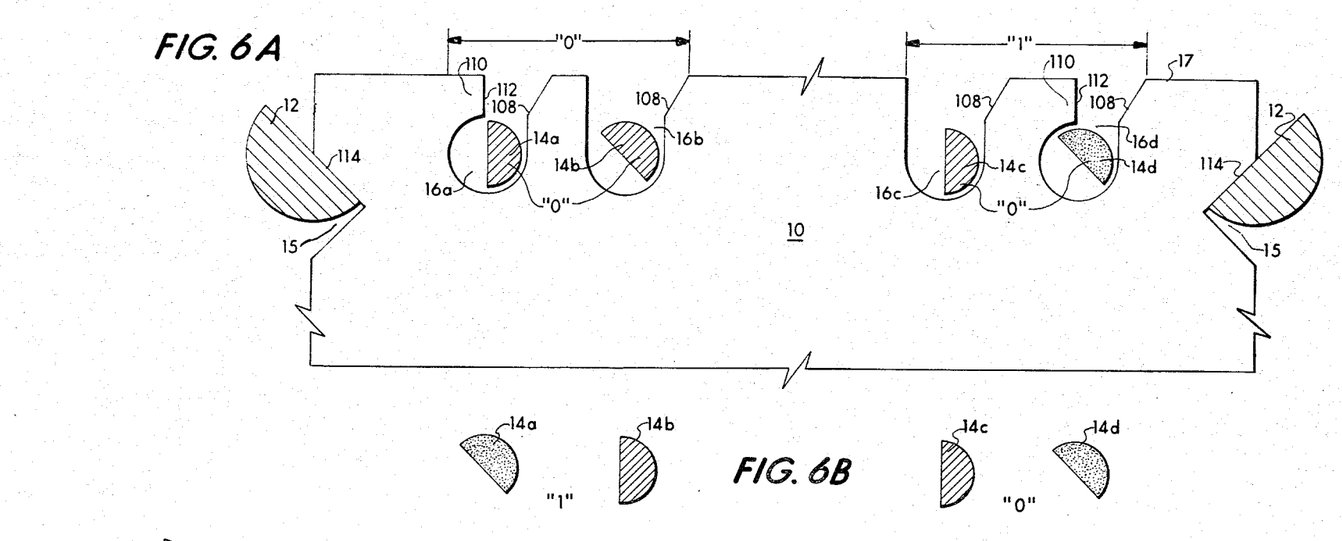
FIGURES 6A to 6D illustrate in detail a preferred embodiment of a card forming a part of the present invention and the relationship of the card notches and slots with respect to the rods engaging them.

FIGURE 6A illustrates in detail an exemplary card 10, engaged by selection rods 14, as well as by holding rods 12. As dictated by the size of the drawing, the card is illustrated shortened in length as well as in height and four exemplary notches are shown. In a practical embodiment of the invention, the cards are 3¼" x 7⅜", successive pairs of notches being disposed all along the upper major card edge 17.

In FIGURE 6A, the notch pairs are designated 16a, 16b and 16c, 16d respectively, each pair containing notches of two different kinds which are sequenced in accordance with one of two binary digits represented by the notch pair. Thus, the notches 16b and 16c may be assumed to be notches of a first kind, having a generally U-shaped configuration with an arcuate interior and a width twice the radius of the arc. A slanting edge portion 108 at the notch entrance progressively serves to widen the latter in the direction of the upper card edge 17. The notches 16a and 16d are notches of a second kind which differ from notches of the first kind solely by the presence of a tab 110, which is in part defined by the upper card edge 17. The interior tab edge portion is defined by a continuation of the aforesaid arc and is connected to the upper card edge 17 by an edge portion 112 normal to the latter. The tab extends toward the center of the notch from one side of the notch entrance, to constrict the latter at its narrowest point to a distance slightly larger than the aforesaid arc radius. The notches 16a and 16d similarly have a slanting edge portion 108 opposite the tab 110, progressively widening the notch entrance in the direction of the upper card edge 17.

As shown in FIGURE 6A, the sequence of the notch pair 16a, 16b is representative of a binary 0. In this sequence a notch of a second kind is followed by a notch of a first kind. The subsequent notch pair 16c, 16d differs from the above-discussed notch pair only in the sequence of the notches, wherein a notch of a first kind is followed by a notch of a second kind. As indicated in FIGURE 6A, the latter sequence of notches is representative of a binary 1.

FIGURE 6A further illustrates the D-shaped center section 106 of the selection rods 14 which engage the notches 16. The selection rods which are paired, are designated 14a, 14b, and 14c, 14d respectively and extend through the correspondingly labeled card notches 16a, 16b, and 16c, 16d respectively. As shown, the D-shaped cross-section has an arc radius that is slightly smaller than the arc radius of each notch. Each selection rod is capable of assuming one of two rotational positions displaced 45° with respect to each other. The individual rods of a rod pair are always at opposite rotational positions. Since the selection rods of each pair are geared together, the energization of one rotary solenoid actuator, e.g. the actuator 18a in FIGURE 2, will serve to rotate both rods of the rod pair 14'. In a preferred embodiment of the invention, the solenoid actuators are spring-biased to a rest position, so that the selection rods assume a normal position which is identical for each selection rod pair. This normal position is designated as the "0" state of the selection rod pair, because it is capable of releasing a pair of notches such as the pair 16a, 16b, sequenced to represent a binary 0. The two selection rod pairs 14a, 14b and 14c, 14d respectively in FIGURE 6A, are both positioned in the "0" state.

Because of the U-shaped configuration of the notch 16b, the selection rod 14b always engages this notch in notch-releasing relationship, regardless of the rotational position of the rod. This is always true in notches of the aforesaid first kind and hence it also applies to notch 16c. The situation is different with respect to notches of the aforesaid second kind, e.g. the notches 16a and 16d. Here, the rotational position of the selection rods determines whether or not the notch is engaged in card-retaining or in card releasing relationship. In the position illustrated, the rod 14a is entirely limited to one-half of the notch 16a. The flat rod surface portion is seen to clear the tab edge portion 112 in this position. Accordingly, the selection rod pair 14a, 14b engages the notch pair 16a, 16b in card-releasing relationship when the rod pair is in the "0" state.

A different arrangement of parts exists with respect to the notch pair 16c, 16d, which is representative of a binary 1. As previously explained, the rod 14c engages the notch 16c in notch-releasing relationship regardless of the rotational position of the rod. Rod 14d, however, is seen to have its curved rod surface portion positioned under the tab of the notch 16d, adapted to retain the latter. In FIGURE 6A, this is indicated by the darkened cross-section of the rod 14d. Thus, the selection rod pair 14c, 14d engages the notch pair 16c, 16d in card retaining relationship when the rod pair is in the "1" state.

FIGURE 6A further illustrates the card slots 15 which are seen to be wedge-shaped, with the apex of each wedge lying on a line slightly below the slots 16. Each slot 15 has an edge portion 114 which slants downward toward the center of the card 10 and a further edge portion perpendicular thereto. The holding rods 12 are seen to be D-shaped in cross-section and engage the edge portions 114 of the slots 15 with the flat rod surface portion. As a consequence, the card has a tendency to be centered as it is engaged by the holding rods. In this position, the holding rods 12 actually support the card 10, such that the selection rods 14 are maintained out of contact with the interior of the corresponding notches 16, as shown.

Figure 6C:
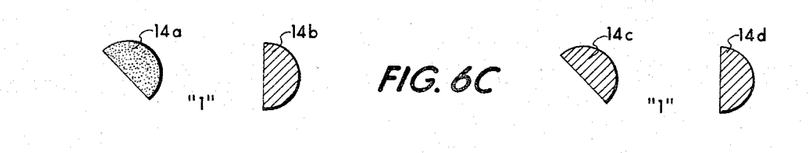
Figure 6D:
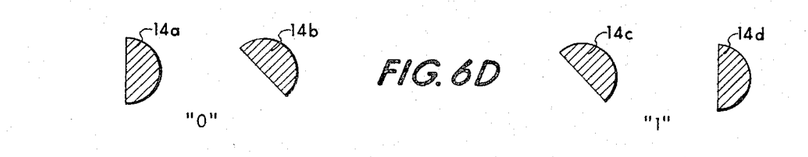

In addition to the selection rod positions shown in FIGURE 6A, there exist three other positional combinations for the two exemplary rod pairs, which will now be considered with reference to the notch arrangement of the card 10 in FIGURE 6A. FIGURE 6B illustrates a situation wherein the first rod pair is in the "1" state and the second pair is in the "0" state. In this position of the rods, the rod 14a, as well as the rod 14d, each shown with darkened cross-section, engage their corresponding notches in the card 10 in card-retaining relationship. FIGURE 6C illustrates a position of the rod pairs wherein both pairs are in the "1" state. Here, only the rod 14a is positioned in card-retaining relationship with respect to the card 10. FIGURE 6D illustrates a position of the selection rod pairs wherein the first pair is in the "0" state and the second pair is in the "1" state. Here, all the selection rods are positioned in card-releasing relationship with respect to the card 10. The holding rods 12 are shown as being rotated out of engagement with the slots 15 in FIGURE 6D, thus permitting the selected card to drop.

As previously explained, the number of notches along the upper edge 17 of the card 10 is not limited to the two pairs shown in FIGURE 6A. Clearly, the greater the number of notch pairs, the larger the number of cards from which a selection can be made. In the example under consideration, the four positional combinations permit the random selection of any card from a group of four suspended cards, notched in accordance with the following binary codes:

| Notch Pair | |
|---|---|
| 16a, 16b | 16c, 16d |
| 0 | 0 |
| 0 | 1 |
| 1 | 0 |
| 1 | 1 |

As pointed out above, each selection rod pair normally assumes a position, as shown in FIGURE 6A, which is representative of the binary state "0." The card whose notch code is 0—0, in accordance with the table above, then fails to be engaged in card-retaining relationship by any selection rod. Were it not for the presence of the holding rods 12, such a card would not be retained when the selection rod pairs are in their normal position and hence, it could not be used. Thus, the selection arrangement would be operative for a maximum of only three cards.

The presence of the holding rods in the present invention, and specifically in the example under consideration, makes possible the use of four cards. The selection of the 0—0 card requires only that the holding rods be rotated out of engagement with the slots 15 and involves no rotation on the part of the selection rods. If any other card of the four cards is to be selected, the selection rods 14 are rotated by applying an appropriate selection signal which energizes the solenoid actuators. When the holding rods subsequently move out of engagement with the slots 15, only the addressed card drops. The card which is notched in accordance with the code 0—0, as well as the other two cards, are each retained by at least one selection rod.

As previously explained, the flat surface portion of the holding rods 12 normally engages the slot edge portion 114 in card-supporting relationship. The position of the slots 15 and of the holding rods 12, as well as their relative dimensions, are precisely predetermined in relation to the overall card length and to the spacing of the guide surfaces 9 from the upper edges 17 of the suspended cards. During a card selection, when the holding rods 12 are rotated out of engagement with the slots 15, a card in the stack may be retained against dropping by only a single selection rod. This will cause the card to tilt by pivoting about the selection rod. The guide surface 9 bears against the edge 17 of the tilting card to restrict the tilt angle. Worst-case conditions, i.e. conditions when the tilt angle is greatest, occur when the single selection rod which retains a card against dropping engages a notch that is located at one extreme of the card edge 17, i.e. closest to a minor card edge.

Figure 5B:
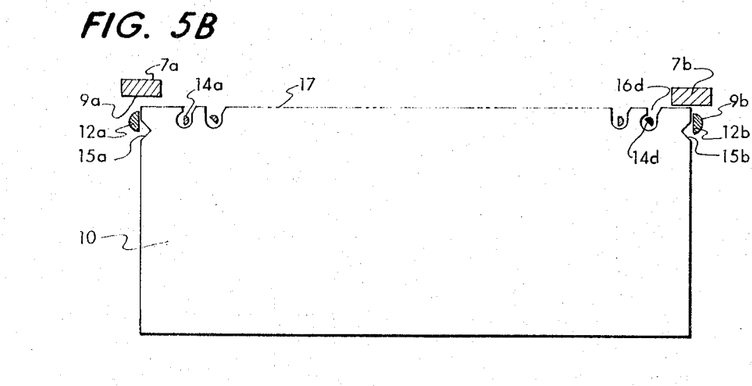

The foregoing situation is schematically illustrated in FIGURE 5 where the selection rod 14d is seen to be the only rod which engages a notch of the card 10 in card-retaining relationship. Following the reference numerals assigned in FIGURE 6, the notch so engaged is designated 16d and is seen to be positioned at one extreme of the upper card edge 17. In FIGURE 5A, the holding rods 12a and 12b support the card 10 to hold it in a horizontal position. The holding rods are shown withdrawn in FIGURE 5B in order to permit the selected card to drop. The non-selected card 10 tilts until its upper edge 17 bears against the guide surface 9b of the guide 7b. The dimensions and relative positions of the different parts must be such that the holding rod 12a is capable of re-engaging the slot 15a following the card selection. Similarly, when the selection rod 14a is the sole retaining rod of a non-selected card during a card selection, the relationship of the various parts must be effective to limit the tilt angle so that the holding rod 12b is capable of re-engaging the slot 15b.

Figure 7A:
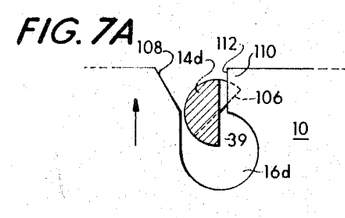
FIGURES 7A and 7B and FIGURES 8A and 8B illustrate in detail pertinent aspects of the card return operation with respect to the selection rods.
Figure 7B:
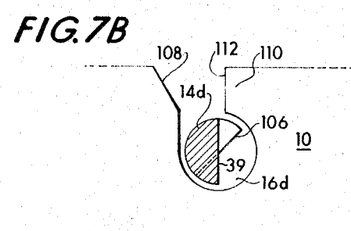
Figure 8A:
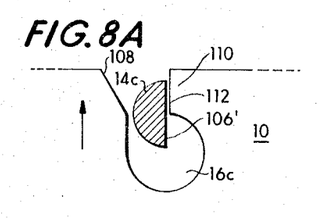
Figure 8B:
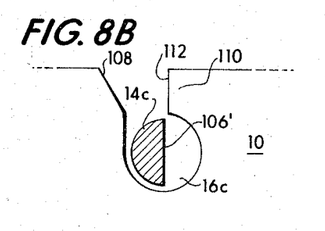
Figure 9A:
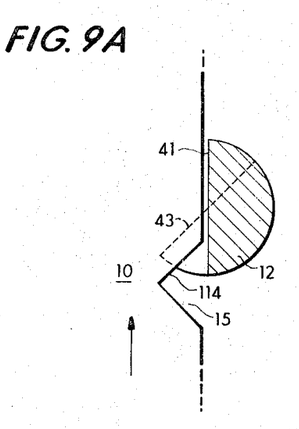
FIGURES 9A and 9B illustrated pertinent aspects of the card return operation relative to the holding rods.
Figure 9B:
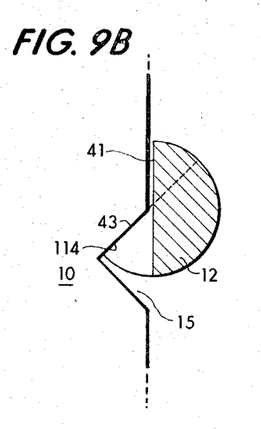

As previous explained in connection with the discussion of FIGURE 3, a limited length of the cross-section of each holding rod and of one rod of each selection rod pair is relieved and is centered about a common vertical plane, coplanar with the lift plate surface 84. When the lift plate—and hence the card held by the surface 84—is raised as illustrated in FIGURE 4B, the card notches and slots respectively engage the relieved portions of the rods. At such time, all of the rods are in their normal position. FIGURES 7 and 8 illustrate in greater detail the action whereby the notches 16a and 16d engage corresponding selection rods, while FIGURE 9 illustrates the engagement by a slot of the corresponding holding rod. Applicable reference numerals are again retained. For the purpose of illustrating the different cross-sections of the rods which are pertinent to this discussion, FIGURES 7–9 view the card 10 from its non-magnetized surface, i.e. from the side opposite that shown in FIGURES 5 and 6. The discussion of FIGURES 7 and 8 is limited entirely to notches of the aforesaid second kind, i.e. to card notches 16a and 16d which include a tab 110 at the notch entrance. It will be clear that notches of the aforesaid first kind, which have a generally U-shaped configuration, are always capable of engaging a selection rod.

FIGURE 7 illustrates the selection rod 14d, having a relieved length 39 and being in a normal card-retaining rotational position. FIGURE 7A shows the upward movement of a card 10, as indicated by the arrow, the notch 16d being aligned with the selection rod 14d. Due to the card-retaining rotational position of the latter selection rod, the central section 106, which has a D-shaped cross-section, is seen to overlap the card tab 110. The relieved rod length 39, which is similarly of D-shaped cross-section, is rotationally displaced from the section 106 by approximately 45°, as discussed in connection with FIGURE 3. As shown, there is no interference between the cross-section of the rod length 39 and the notch tab. The length 39 is thus able to move past the tab edge portion 112 without interference as the card rises in the vertical plane about which the length 39 is centered. The engagement of the rod 14d by the notch 16d is facilitated by the slanted edge portion 108 at the notch entrance.

FIGURE 7B illustrated the relationship of the selection rod 14d and the card 10 after the upward movement of the latter has ceased. The central section 106 of the selection rod, which is normal to the plane of the paper and is positioned behind the latter, is now seen to be in registry with the arcuate interior of the notch 16d. In this position the application of positive air pressure to the card, as explained in connection with the discussion of FIGURE 4B, is effective to blow the card onto the rod section 106. It will be clear from FIGURE 7B that no interference between any part of the selection rod and the tab 110 occurs during the latter operation.

As previously explained in connection with FIGURE 3, only one rod in each pair of selection rods has a relieved length 39. The other rod, as shown in FIGURE 8 and designated 14c, has a longer central rod section 106' of D-shaped cross-section, which directly engages the corresponding card notch. As shown by the vertical position of its flat surface portion, the rod 14c normally assumes a card-releasing rotational position. FIGURE 8A shows the process whereby the notch 16c of the rising card 10 engages the selection rod 14c. As before, the slanting edge portion 108 facilitates the engagement of the rod 14c with the slot 16c to avoid any interference of the rod with the tab edge portion 112. FIGURE 8B shows the relative positions of the card notch 16c and the selection rod 14c upon the completion of the upward card movement. Here again, the central rod section 106' is seen to be positioned in registry with the arcuate interior of the notch 16c. The application of air pressure to the card 10 then merely blows the card further along the central rod section 106' in a direction normal to the plane of the paper.

As previously explained, the holding rods 12, like the selection rods, have a substantially D-shaped cross-section which is designated 43 in FIGURE 9. In the normal rotational position of the holding rods, illustrated in FIGURE 9, the flat surface portion of the rod section 43 is positioned at a 45° angle. A limited length 41 of each holding rod 12 is relieved, such relieved length being centered about the same vertical plane as the relieved lengths 39 of the selection rods. As shown in FIGURE 9, the relieved length 41 is similarly D-shaped in cross-section and is rotationally displaced by approximately 45° from the cross-sectional area designated 43.

FIGURE 9A illustrates the engagement of the holding rod 12 by the notch 15 of a returning card 10, as the latter is raised by the lift plate. As shown, the relieved length 41 of the holding rod offers no interference to the rising card. Such interference would clearly occur relative to the cross-sectional rod portion 43, in the normal position of the holding rod, as indicated by the overlap between the latter and the card 10. In FIGURE 9B the card has been raised to its ultimate position such that the flat surface portion of the cross-sectional area 43 and the edge portion 114 of the slot 15 coincide approximately. When positive air pressure is subsequently applied to the card 10, the latter is blown in a direction normal to the plane of the drawing and away from the viewer. Due to the position of the slot edge portions 114 and the flat surface portion of the cross-section 43, no interference is offered to the latter card movement.

Figure 10:
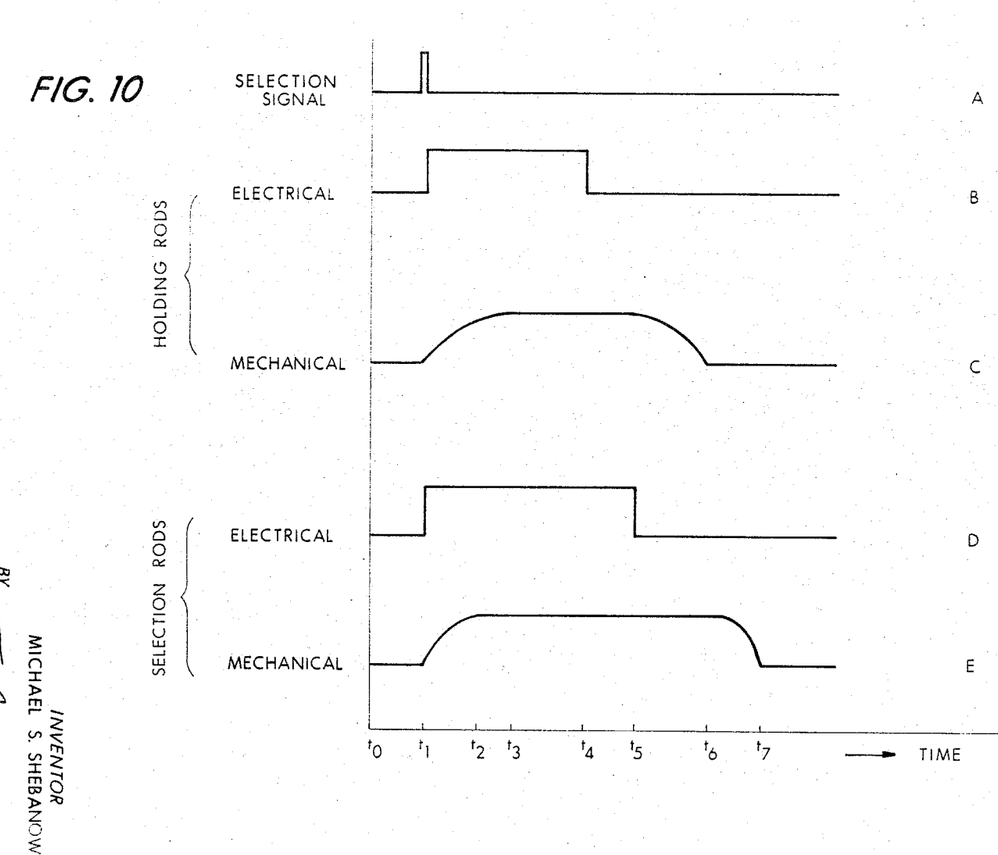
FIGURE 10 illustrates the relative timing of the operation of the selection rods and of the holding rods.

FIGURE 10 illustrates the relative timing of the operation of the selection rods and of the holding rods respectively, during a complete card selection operation. Upon the appearance of a selection signal, as shown in FIGURE 10A, the energization of the solenoid actuators 18 and 20 is initiated at the time $t_1$. The energization circuit connected to each solenoid may include a one-shot multivibrator, responsive to the selection signal and having a predetermined period, and a drive amplifier connected to the output thereof. It will, however, be understood that the invention is not so limited and that various well-known circuits may be employed for this purpose.

The waveform of the voltage applied to the solenoids of the addressed selection rod actuators 18 is illustrated in FIGURE 10D, such voltage being applied for 25 milliseconds in one practical embodiment of the present invention. The response curve of a selection rod actuator 18 is shown in FIGURE 10E. In the aforesaid embodiment of the invention, each actuator 18 may have a response time of approximately 7 milliseconds, i.e. 7 milliseconds elapse between times $t_1$ and $t_2$ in FIGURE 10E, before the addressed selection rods have turned a full 45° following the energization of the solenoids.

As shown in FIGURE 10B, the energization of the holding rod solenoid actuators 20 is similarly initiated at time $t_1$. From FIGURE 10C it appears that the holding rods reach their full 45° position at time $t_3$. In the aforesaid embodiment of the invention, this may occur approximately 12 milliseconds after their initial energization, i.e. 5 milliseconds after the selection rods have reached their 45° position. The longer response time is due to the fact that the holding rods require larger solenoid actuators which have a slower response. The larger actuators are called for since the holding rods support all the cards in the stack and must be capable of rotating into and out of engagement with the slots 15.

The energization of the holding rod actuators 20 is terminated at time $t_4$, approximately 20 milliseconds after their initial energization. The energization of the selection rod actuators 18 is terminated at time $t_5$, approximately 25 milliseconds after their initial energization. See FIGURES 10B and 10D. While the actuators in each case are spring-biased to their initial position as pointed out above, the inductance of the solenoid in each case prevents the actuators from returning to their initial position for approximately 15 milliseconds following the termination of energization. Thus, the holding rods return to their normal position at time $t_6$, while the selection rods return to their normal position at time $t_7$, i.e. approximately 5 milliseconds later.

From the foregoing discussion, it will be clear that the sequence of events following the occurrence of a selection signal causes the addressed selection rods to complete a 45° rotation at time $t_2$, while the card is still supported by the holding rods. Since the selection rods are out of contact with the notches 16 during this interval, the rotation of each addressed selection rod fails to cause wear in the notch engaged by it. Approximately 5 milliseconds after the action of the selection rods is completed, the holding rods will have turned 45° to permit the selected card to drop to the waiting platform below. The period of the one-shot multivibrators, or equivalent circuitry, is chosen to permit adequate time for the selected card to become disengaged from all the rods before the latter initiate their return rotation by spring action.

As seen from FIGURE 10C, the return rotation of the holding rods to their normal position is complete at time $t_6$. At this time the selection rods are still in their rotated position, as shown in FIGURE 10E. In other words, at time $t_6$ the holding rods 12 again support the card in a manner whereby the selection rods are out of contact with the card notches. The return rotation of the selection rods then begins and is completed at time $t_7$. Again, no notch wear results from this action since the selection rods do not rub against the interior of the card notches.

The relative timing of the energization circuitry will depend, in each instance, upon the response times of the energized solenoid actuators 18 and 20. As pointed out above, the timing must be such that the rotation of the selection rods is completed following a selection signal, before the holding rods release the card. Similarly, the holding rods must return to their normal position before the return of the selection rod is initiated. Within the context of these requirements, it may be necessary to delay the initiation of energization of one or the other one-shot multivibrator. Further, the speed with which the respective solenoids return to their rest position will determine at what time their energization is terminated.

From the foregoing explanation, it will be clear that the present invention provides an improved card selection system which can operate more rapidly and more reliably than heretofore available equipment of a similar kind. Economy and simplicity of construction are preserved, the latter quality contributing to the improved reliability of the system.

From the foregoing disclosure of the present invention, it will be apparent that numerous modifications, departures, substitutions and equivalents will now occur to those skilled in the art, all of which fall within the true scope and spirit contemplated by the present invention, as defined by the claims herein.

What is claimed is:

1. In combination, a stack of record cards having substantially identical dimensions and supported with the upper edge of each card disposed in a substantially horizontal position, each of said upper edges including successive pairs of notches aligned in rows along the depth of said stack, each notch pair containing a notch of a first and of a second kind sequenced in accordance with a first or a second binary digit represented by said notch pair, the side edges of respective cards each including a slot located near said upper edge, corresponding ones of said slots being aligned in rows along the depth of said stack, a plurality of paired selection rods each extending transverse to said upper edges through a row of notches and being adapted to assume first and second rotational positions substantially 45° apart, each of said selection rods having a cross-section adapted to engage only notches of said second kind in card-retaining relationship and only when said rod is in said second rotational position, a pair of substantially identical, rotatable holding rods parallel to said selecting rods, said holding rods being normally positioned to engage said rows of slots in supporting relationship such that said selection rods are out of contact with the notches through which they extend, first positioning means for normally maintaining each pair of selection rods in a first state, the individual rods of each pair in said first state assuming first and second rotational positions respectively adapted to release notch pairs representative of said first binary digit, said first positioning means being responsive to a coded selection signal for rotating addressed selection rod pairs to a second state, the individual rods of each pair in said second state assuming second and first positions respectively adapted to release notch pairs representative of said second binary digit, and second positioning means for rotating said holding rods out of engagement with said slots to release a single card addressed by said selection signal.

2. The apparatus of claim 1 wherein said records are substantially rectangular in form each suspended with a major edge thereof positioned horizontally uppermost, said notches of said first kind having a generally U-shaped configuration terminating in an interior arcuate portion of a width equal to twice the arc radius, said notches of said second kind differing from said notches of said first kind by the presence of a tab at the notch entrance, said tab being in part defined by said arc and extending uniformly inward from one side of said notch entrance a distance slightly less than said arc radius, the other side of said notch entrance slanting outward in notches of both kinds to widen said entrance progressively in a direction approaching said upper edge, the notch-engaging portions of each of said selection rods having a D-shaped cross-section defined by a radius slightly smaller than said arc radius and enabling it to be positioned in said arcuate interior notch portion, each of said selection rods in said first rotational position being positioned entirely in one-half of said interior notch portion with the flat rod surface portion of said D-shaped cross-section vertically disposed to clear the tab present in notches of said second kind, each of said selection rods in said second rotational position having its curved rod surface portion partially disposed under the arcuate portion of said tab.

3. The apparatus of claim 2 wherein each of said slots is substantially wedge-shaped, the notch-engaging portion of each of said holding rods being D-shaped in cross-section and normally engaging the upper edge portion of said wedge-shaped slots with the flat rod surface portion of said D-shaped cross-section.

4. The apparatus of claim 3 wherein a limited length of each of said holding rods is relieved, each selection rod which is normally in said second rotational position being relieved in a limited length thereof, said limited rod lengths being centered about a common vertical plane and being D-shaped in cross-section, the D-shaped cross-section of each of said relieved lengths being rotationally displaced by approximately 45° with respect to said first-recited rod portion of D-shaped cross-section, said rods being capable, in their normal position, of engaging the notches and slots respectively of a returning card which is rising in said common plane from a position below said rods.

5. The apparatus of claim 1 wherein said first positioning means include a pair of mating gears carried by each pair of selection rods adapted to cause the rods thereof to rotate simultaneously in opposite directions, and separate actuating means coupled to one gear of each gear pair and being spring-biased to a start position, said actuating means being responsive to said selection signal to rotate the gear coupled thereto through substantially 45° and to maintain it there for an interval sufficient to effect a card selection.

6. The apparatus of claim 5 wherein said second positioning means include additional actuating means corresponding to each of said holding rods and coupled thereto, said additional actuating means being spring-biased to a start position and being effective to rotate said holding rods in timed relationship with the rotation of said selection rods.

7. The apparatus of claim 6 wherein said positioning means include timing means effective, upon the occurrence of each selection signal, to control the energization of each of said actuating means both as to its initiation and its duration, said timing means being effective for each card selection to initiate the rotation of said holding rods out of their normal position only upon the completion of a corresponding rotation by the addressed selection rods, and being further effective to initiate the return rotation of said selection rods to their normal position only upon the completion of a corresponding rotation by said holding rods.

8. The apparatus of claim 1 and further including a pair of horizontal guide surfaces positioned above said selection rods each straddling the side edges of said suspended cards, said guide surfaces being coplanar and being vertically spaced from the upper edges of said suspended cards a distance adapted to limit the tilt angle of a card suspended only by the last notch along said upper edge during a card selection to enable said holding rods to re-engage said slots following said card selection.

9. A mechanism for selecting a single record card at random from a stack of suspended cards each having notches of a first and of a second kind disposed along its upper edge and a pair of opposite slots disposed in the side edges of said card close to said upper edge, said notches being arranged in successive pairs each containing notches of both kinds sequenced in accordance with one of two binary digits represented by said notch pair, comprising a plurality of paired horizontal selection rods adapted to extend through corresponding card notches, each of said selection rods being adapted to assume first and second rotational positions substantially 45° apart in releasing and retaining relationship respectively with notches of said second kind and in releasing relationship in both positions with notches of said first kind, first positioning means for normally maintaining each selection rod pair in a first state wherein the individual rods thereof assume opposite rotational positions in releasing relationship with any pair of engaged notches representative of said first binary digit, said first positioning means being responsive to a selection signal for rotating addressed selection rod pairs to a second state wherein the individual selection rods of each addressed pair assume opposite rotational positions in releasing relationship with any pair of engaged notches representative of said second binary digit, a pair of rotatable holding rods parallel to said selection rods, and second positioning means for normally maintaining said holding rods in supporting engagement with said slots so as to hold said card notches out of contact with selection rods extending therethrough, said second positioning means being operative in predetermined timed relationship with the operation of said first positioning means for rotating said holding rods out of engagement with said slots.

10. The apparatus of claim 9 wherein notches of said first kind each have a substantially U-shaped configuration, the arcuate portion of said U-shaped configuration being continued in each notch of said second kind to form a tab at one side of said notch partially constricting the latter, the notch-engaging part of each of said selection rods being substantially D-shaped in cross-section and being dimensioned such that in said first rotational position said rod is confined to one-half of each notch engaged thereby and the flat rod surface portion of said D-shaped cross-section vertically clears said tab in a notch of said second kind, each of said selection rods in said second rotational position having the curved rod surface portion of said D-shaped cross-section positioned partially below said tab in each notch of said second kind engaged thereby.

11. The apparatus of claim 10 wherein each selection rod which is normally in said second rotational position is relieved in a limited length centered about a common vertical plane, said selection rods being capable, in their normal rotational positions, to engage card notches of both kinds in a returning card positioned below said rods and rising in said plane.

12. The apparatus of claim 10 wherein each of said relieved lengths of said selection rods has a D-shaped cross-section which is rotationally displaced by an angle of approximately 45° with respect to said first-recited rod part of D-shaped cross-section.

13. The apparatus of claim 11 wherein said slots each include an edge portion sloping downward toward the center of the corresponding card, said holding rods being substantially D-shaped in cross-section and being adapted, in their normal rotational position, to engage said edge portions with their flat rod surface portions, said holding rods being relieved in a limited length thereof centered about said common plane and being adapted to accept the slots of said returning card in said normal rotational position.

14. The apparatus of claim 9 and further including a pair of coplanar horizontal guide surfaces positioned above said selection rods, each of said surfaces being spaced from the upper edges of said suspended cards and straddling corresponding side edges thereof, the spacing of said guide surfaces from said upper edge being chosen to limit the maximum tilt angle of each card under worst-case selection conditions to enable said holding rods to re-engage said slots following a card selection.

15. The apparatus of claim 9 wherein each pair of selection rods is geared together to rotate jointly to mutually opposite rotational positions substantially 45° apart.

16. The apparatus of claim 9 wherein said positioning means include actuating means responsive to said selection signals for rotating said rods out of their normal positions, and means for biasing said actuating means to a normal start position.

17. The apparatus of claim 16 wherein said positioning means include timing means adapted to control the energization of said actuating means, said timing means being effective, upon the occurrence of said selection signal, to complete the rotation of said addressed selection rod pairs from said first to said second state prior to initiating the rotation of said holding rods out of their normal position, said timing means being further effective to return said holding rods to their normal position following a card selection prior to initiating the return of said selection rod pairs to said first state.

18. A flexible record card of substantially rectangular dimensions, comprising at least one magnetizable surface, a plurality of notches of a first and of a second kind disposed along a major edge of said card and being of identical depth, successive pairs of notches each containing notches of both kinds sequenced in accordance with a first or a second binary digit represented by said notch pair, notches of said first kind each having a generally U-shaped configuration terminating in an interior arcuate portion of a width equal to twice the arc radius, notches of said second kind differing from said notches of said first kind by the presence of a tab integral with said card and extending inward from one side of the notch entrance, said tab being defined by said arc, by said major edge and by an edge portion therebetween normal to said major edge and constricting said notch entrance at its narrowest point to a distance slightly larger than said arc radius, and a slot disposed in each minor edge of said card in close proximity to said notched major edge, each of said slots having an edge portion sloping downward toward the center of said card.

19. The record card defined by claim 18 wherein the same side of each notch entrance, opposite said tab in notches of said second kind, slants outward to widen said entrance progressively in a direction approaching said notched major edge.

20. The record card defined by claim 19 wherein each of said slots has a wedge-shaped configuration in which the edge portions are substantially perpendicular to each other, the wedge center of said slots being positioned on a line immediately below the arcuate portions of said slots.

References Cited by the Examiner

UNITED STATES PATENTS

| 2,602,451 | 7/1952 | Hofgaard | 129—16.1 |
| 3,105,593 | 10/1963 | Fredkin | 209—110 |
| 3,184,724 | 5/1965 | Irasek | 129—16.1 X |
| 3,267,939 | 8/1966 | Ford et al. | 129—16.1 X |

FOREIGN PATENTS

| 614,436 | 12/1948 | Great Britain. |

JEROME SCHNALL, *Primary Examiner.*